US009694340B2

(12) United States Patent
Kim et al.

(10) Patent No.: US 9,694,340 B2
(45) Date of Patent: Jul. 4, 2017

(54) REACTOR FOR SOLID AMMONIUM SALT, A METHOD OF CONTROLLING THE REACTOR, AND $NO_x$ EMISSION PURIFICATION SYSTEM USING SOLID AMMONIUM SALT AND SELECTIVE CATALYTIC REDUCTION

(71) Applicant: KOREA INSTITUTE OF MACHINERY & MATERIALS, Daejeon (KR)

(72) Inventors: Hong-Suk Kim, Daejeon (KR); Gyu-Baek Cho, Daejeon (KR); Yong-Jin Kim, Daejeon (KR); Jun-Ho Lee, Daejeon (KR); Young-Il Jeong, Seoul (KR); Seok-Hwan Lee, Daejeon (KR); Cheol-Woong Park, Daejeon (KR); Chang-Ki Kim, Daejeon (KR); Sun-Youp Lee, Seoul (KR); Jang-Hee Lee, Daejeon (KR); Seung-Mook Oh, Daejeon (KR); Kern-Yong Kang, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 107 days.

(21) Appl. No.: 14/382,614

(22) PCT Filed: Dec. 12, 2013

(86) PCT No.: PCT/KR2013/011542
§ 371 (c)(1),
(2) Date: Sep. 3, 2014

(87) PCT Pub. No.: WO2014/196705
PCT Pub. Date: Dec. 11, 2014

(65) Prior Publication Data
US 2015/0231595 A1    Aug. 20, 2015

(30) Foreign Application Priority Data

Jun. 5, 2013    (KR) .................. 10-2013-0064971

(51) Int. Cl.
*B01D 50/00*    (2006.01)
*B01J 19/24*    (2006.01)
(Continued)

(52) U.S. Cl.
CPC .......... *B01J 19/24* (2013.01); *B01D 53/9431* (2013.01); *B01D 53/9495* (2013.01);
(Continued)

(58) Field of Classification Search
CPC .... B01J 2219/00058; B01J 2219/00087; B01J 19/24; B01D 53/9495; G05B 15/02
(Continued)

(56) References Cited

U.S. PATENT DOCUMENTS

| | | | | |
|---|---|---|---|---|
| 5,809,774 A | * | 9/1998 | Peter-Hoblyn | ......... B01D 53/90 60/274 |
| 2003/0213234 A1 | * | 11/2003 | Funk | .................. B01D 53/9431 60/286 |

(Continued)

FOREIGN PATENT DOCUMENTS

| | | |
|---|---|---|
| DE | 102009060286 A1 * | 6/2011 |
| JP | 2011122593 A | 6/2011 |

(Continued)

OTHER PUBLICATIONS

International Search Report mailed Mar. 7, 2014 in International Application No. PCT/KR13/011542 filed Dec. 12, 2013.
(Continued)

*Primary Examiner* — Tom P Duong
(74) *Attorney, Agent, or Firm* — Hauptman Ham, LLP

(57) ABSTRACT

In a reactor for solid ammonium salt, a method of controlling the reactor, and a NOx emission purification system
(Continued)

using solid ammonium salt and selective catalytic reduction, the reactor includes a first chamber and a second chamber. The first chamber has an exhaust and a first heating element. Solid ammonium salt is in the first chamber. The second chamber has a second heating element and is formed at a side of the first chamber. The first chamber is connected with the second chamber. Solid ammonium salt is in the second chamber. An amount of the solid ammonium salt in the second chamber is more than that in the first chamber, so that the first chamber is heated and cooled faster than the second chamber.

16 Claims, 5 Drawing Sheets

(51) Int. Cl.
  *B01D 53/94* (2006.01)
  *B01J 19/00* (2006.01)
  *G05B 15/02* (2006.01)
(52) U.S. Cl.
  CPC .......... *B01J 19/0006* (2013.01); *G05B 15/02* (2013.01); *B01J 2219/00058* (2013.01); *B01J 2219/00087* (2013.01); *B01J 2219/00132* (2013.01); *B01J 2219/00162* (2013.01); *B01J 2219/24* (2013.01)
(58) Field of Classification Search
  USPC .................................................. 422/180, 305
  See application file for complete search history.

(56) References Cited

U.S. PATENT DOCUMENTS

| 2007/0079599 A1* | 4/2007 | Osaku ................... F01N 3/2066 60/283 |
| 2008/0066453 A1* | 3/2008 | Oberski ................ F01N 3/2066 60/286 |
| 2008/0102010 A1 | 5/2008 | Bruck et al. |
| 2008/0219908 A1 | 9/2008 | Grochowski |
| 2008/0260597 A1* | 10/2008 | Suzuki ................... B01B 1/005 422/148 |
| 2010/0047638 A1* | 2/2010 | Johannessen ...... B01D 53/9431 429/421 |
| 2011/0008228 A1 | 1/2011 | Hammer et al. |
| 2011/0236294 A1* | 9/2011 | Svagin ................... C01C 1/006 423/352 |
| 2011/0280768 A1* | 11/2011 | Kawasaki ............. B01D 53/90 422/111 |

FOREIGN PATENT DOCUMENTS

| KR | 1020070110079 A | 11/2007 |
| KR | 100918602 B1 | 9/2009 |
| KR | 100924591 B1 | 10/2009 |
| KR | 100999574 A | 12/2010 |
| KR | 1020080111966 | * 12/2010 |
| KR | 101185413 B1 | 9/2012 |

OTHER PUBLICATIONS

Written Opinion mailed Mar. 7, 2014 in International Application No. PCT/KR13/011542 filed Dec. 12, 2013.

* cited by examiner

REACTOR FOR SOLID AMMONIUM SALT, A METHOD OF CONTROLLING THE REACTOR, AND NO$_x$ EMISSION PURIFICATION SYSTEM USING SOLID AMMONIUM SALT AND SELECTIVE CATALYTIC REDUCTION

BACKGROUND

1. Field of Disclosure

The present disclosure of invention relates to a reactor for solid ammonium salt, a method of controlling the reactor, and a NOx emission purification system using solid ammonium salt and selective catalytic reduction. More particularly, the present disclosure of invention relates to a reactor for solid ammonium salt, a method of controlling the reactor, and a NOx emission purification system using solid ammonium salt and selective catalytic reduction, used for purifying nitrogen oxide (NOx) which is a harmful exhaust gas exhausted from an internal combustion engine or a combustor. In the NOx emission purification system, the solid ammonium salt such as ammonium carbamate ($NH_2COOCH_4$), ammonium carbonate (($NH_4)_2CO_3$) and so on is thermally decomposed to be ammonia, and the ammonia is reacted with NOx in the selective catalytic reduction to be purified into nitrogen harmless to human beings.

Description of Related Technology

Generally, exhaust gas recirculation (EGR) or selective catalytic reduction (SCR) is applied to reduce nitrogen oxide exhausted from the internal combustion engine especially for a diesel engine. In the EGR, density of nitrogen oxide is reduced. In SCR, nitrogen oxide is reacted with a catalyst using a reducing agent like ammonia, urea or hydrocarbon, and thus nitrogen oxide is deoxidized into nitrogen and oxygen.

In a HC-SCR technology which is one of the SCR, hydrocarbon like diesel is used as the reducing agent, and thus an additional providing device for the reducing agent is unnecessary. However, oxygen within an exhaust gas and hydrocarbon are reacted, and thus the reduction of NOx is not effective.

In a urea SCR technology which is another technology of the SCR, liquid urea made of melting solid urea in a normal temperature in water, is injected into an exhaust line of a vehicle. The liquid urea injected into the exhaust gas is thermally decomposed into ammonia, and the ammonia deoxidizes nitrogen oxide into harmless nitrogen using selective catalytic reduction like $V_2O_5$ or zeolite. Nitrogen oxide is efficiently purified in a wide range of temperature in the urea SCR technology, and the urea SCR technology has high durability.

However, a massive social infrastructure is necessary to provide liquid urea, and additional devices like a container 30 and an injector 40 are necessary, for the urea SCR technology. In addition, a freezing point of the liquid urea is −11° C. and additional heat insulation is necessary to maintain systems like the container and the injector under the temperature, and thus overall system may be complicated. Further, more than 60% water is mixed to the liquid urea is used to decrease the freezing point of the liquid urea, and thus the container for the liquid urea may be increased.

As the technology to solve the above-mentioned problem in the urea SCR technology, Korean Patent Number KR10-0924591 and Korean Patent Number KR10-0999574 disclose the technologies of using solid urea. However, the solid urea is thermally decomposed at about 140° C. and thus electric energy or exhaust heat energy is needed much more, and urea is solidified in a duct line when the temperature for thermal decomposition is not maintained in the duct line or the reactor.

Further, Korean Patent Number KR10-1185413 discloses the technology of using the solid urea having a relatively lower temperature for the thermal decomposition. However, as illustrated in FIG. 1, the reactor 1 storing solid ammonium salt 10 is entirely heated by a heater 20 or a heat exchanger 30 using an exhaust heat or a coolant of the vehicle, to thermally decompose the solid ammonium salt to ammonia, and thus amount of the energy used in the process is increased.

SUMMARY

The present invention is developed to solve the above-mentioned problems of the related arts. The present invention provides a reactor for solid ammonium salt capable of reducing energy consumption. The present invention also provides a method of controlling the reactor. The present invention also provides NOx emission purification system using solid ammonium salt and selective catalytic reduction. More specifically, the NOx emission purification system is equipped as a module in which solid ammonium salt is easily set up, and thus the solid ammonium salt may be easily changed in a garage and the social infrastructure for providing the liquid urea is reinforced. A liquid injecting system is unnecessary compared to a liquid urea SCR system, and thus the NOx emission purification system may be more easily equipped.

In addition, solid ammonium salt has ammonia 3-4 times much more than liquid urea, and thus the capacity of the container is increased by 3-4 times and much farther driving is possible.

Further, the temperature of the reactor is rapidly increased to the thermal decomposing temperature of the solid ammonium salt, and thus NOx may be decreased at an initial driving of the vehicle.

According to an example embodiment, the reactor includes a first chamber and a second chamber. The first chamber has an exhaust and a first heating element. Solid ammonium salt is in the first chamber. The second chamber has a second heating element and is formed at a side of the first chamber. The first chamber is connected with the second chamber. Solid ammonium salt is in the second chamber. An amount of the solid ammonium salt in the second chamber is more than that in the first chamber, so that the first chamber is heated and cooled faster than the second chamber.

In an example embodiment, a connecting portion connecting the first chamber with the second chamber may have a pressure valve, and the pressure valve may be automatically open when the pressure of the second chamber is higher than that of the first chamber.

In an example embodiment, a blocking layer may be formed between the first and second chambers for insulation.

In an example embodiment, the first heating element may be an electric heater, and the second heating element may be one or a combination of an electric heater, an exhaust gas and engine cooling water.

In an example embodiment, a heat transferring element having an expanded shape, a porous shape or a mesh shape may be formed in the first chamber. The heat transferring element may include a metal material to make contact with the first heating element. The solid ammonium salt may be formed at the heat transferring element.

In an example embodiment, the first chamber may include a rapid cooling element.

In an example embodiment, an insulating layer may be formed to cover an outside of the second chamber.

In an example embodiment, an end portion of the second chamber may be open to be combined with a cover, and the solid ammonium salt in the second chamber may be formed as a replaceable solid ammonium salt cartridge.

In an example embodiment, the solid ammonium salt cartridge may be sealed, and thus the solid ammonium salt may be partially open to be inserted into the second chamber or may be partially open right after inserted into the second chamber.

In an example embodiment, the solid ammonium salt cartridge may be sealed and may have an opening through which a connecting portion connecting the first and second chambers with each other is connected. A sealing element may be formed around the opening of the solid ammonium salt cartridge.

In an example embodiment, a pressure valve may be formed at a connecting portion connecting the first and second chambers with each other, and a temperature sensor and a pressure sensor may be formed at the first and second chambers.

In an example embodiment, a solenoid valve may be formed at a connecting portion connecting the first and second chambers with each other, and a temperature sensor and a pressure sensor may be formed at the first and second chambers, and thus an ON/OFF of the solenoid valve may be controlled based on the pressure measured at the first and second chambers.

In an example embodiment, the solid ammonium salt having substantially same ingredient may be stored both in the first and second chambers.

According to another example embodiment, a method of controlling a reactor for solid ammonium salt includes heating first and second chambers of the reactor for solid ammonium salt, to provide ammonia to an ammonium dozing module (step S10). The ammonia is generated from sublimating the solid ammonium salt in the first chamber. A heat provided into the second chamber is controlled to maintain the pressure of the second chamber within a constant pressure range, to provide ammonia to the ammonium dozing module via the first chamber (step S20). The ammonia is generated from the sublimating the solid ammonium salt in the second chamber. Heating the first and second chambers is stopped and the first chamber is cooled faster than the second chamber, so that the ammonia generated in the second chamber is sublimated in the first chamber to be stored as the solid ammonium salt (step S30).

In an example embodiment, in the step S20, an alarm or a warning light may be operated when the temperature of the second chamber is increased more than a predetermined temperature and the pressure of the second chamber is not increased (step S21).

According to still another example embodiment, a NOx emission purification system using solid ammonium salt and selective catalytic reduction includes the reactor, an ammonium dozing module, an injecting nozzle, a selective catalytic reduction and an electric control unit. The ammonium dozing module is connected to the exhaust of the reactor and controls the providing of the ammonia generated in the reactor. The injecting nozzle is connected to the ammonium dozing module and is disposed at an exhaust line, to inject the ammonia into the exhaust line. The selective catalytic reduction is disposed in the exhaust line, and mixes NOx included in the exhaust gas with the ammonia injected into the exhaust line to deoxidize NOx into nitrogen and water. The electric control unit is connected to the reactor and the ammonium dozing module, to control the generation and the providing of the ammonia.

In an example embodiment, the NOx emission purification system may further comprise a subsidiary reactor for solid ammonium salt having a heating element and connected to the ammonium dozing module. Solid ammonium salt is in the subsidiary reactor.

In an example embodiment, the solid ammonium salt may be ammonium carbamate ($NH_2COOCH_4$) or ammonium carbonate (($NH_4)_2CO_3$).

According to the present example embodiments, first and second chambers are divided in the reactor and the temperature in the first chamber is rapidly increased to reach the temperature of the thermal decomposition of solid ammonium salt, and thus NOx may be rapidly decreased at an initial driving of the vehicle and the energy consumption may be decreased to heat the reactor.

BRIEF DESCRIPTION OF THE DRAWINGS

The above and other features and advantages will become more apparent by describing exemplary embodiments thereof with reference to the accompanying drawings, in which.

DETAILED DESCRIPTION

Hereinafter, exemplary embodiment of the invention will be explained in detail with reference to the accompanying drawings.

Figure 1:
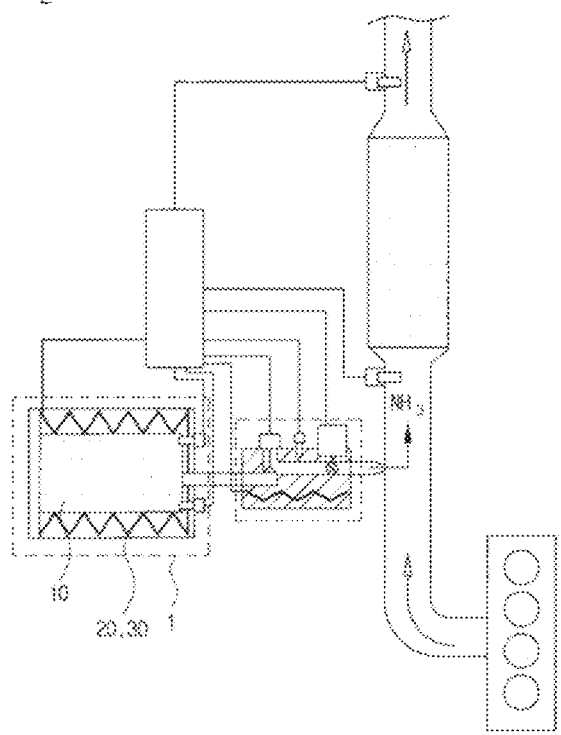
FIG. 1 is a conceptual view illustrating a conventional NOx emission purification system using solid ammonium and selective catalytic reduction.
Figure 2:
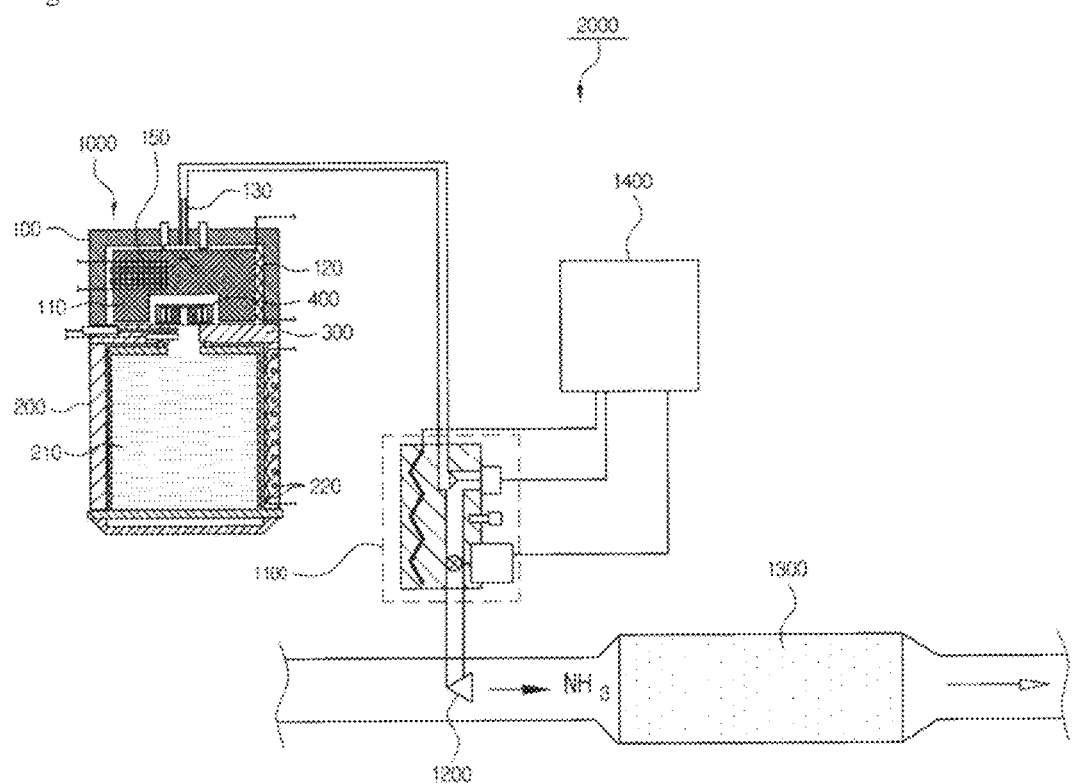
FIG. 2 is a conceptual view illustrating a NOx emission purification system using solid ammonium and selective catalytic reduction according to an example embodiment of the present invention.
Figure 3:
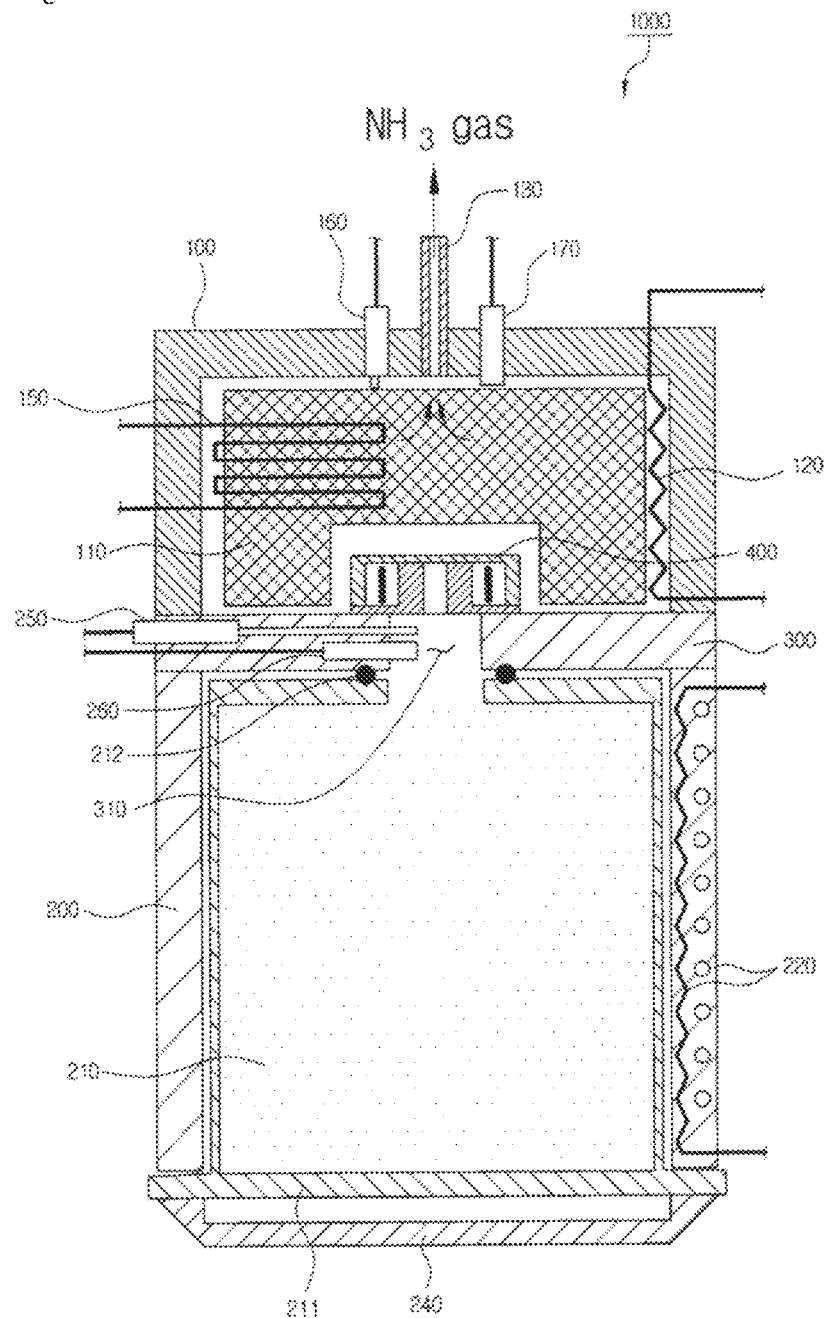
FIGS. 3 and 4 are conceptual views illustrating a reactor for solid ammonium salt in FIG. 2.
Figure 4:
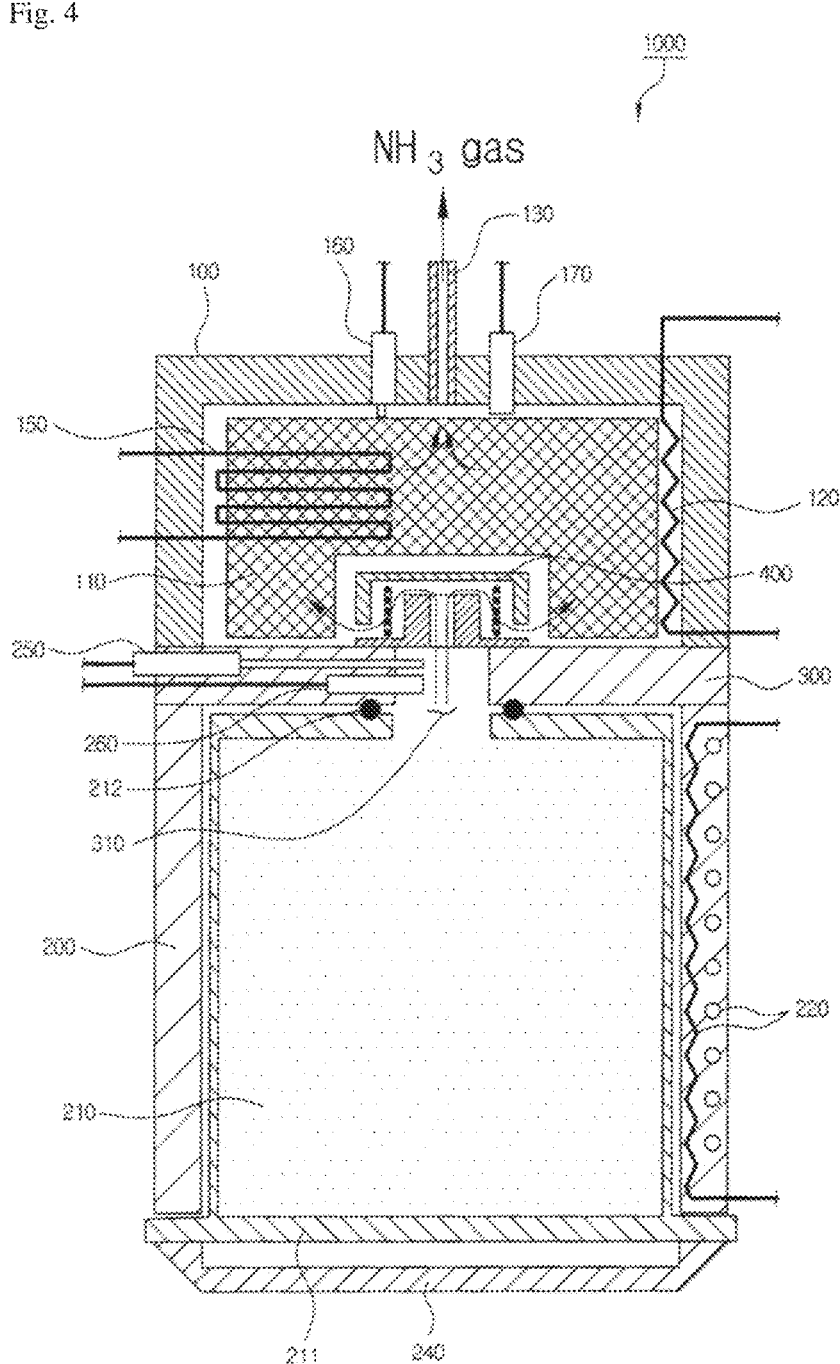
Figure 5:
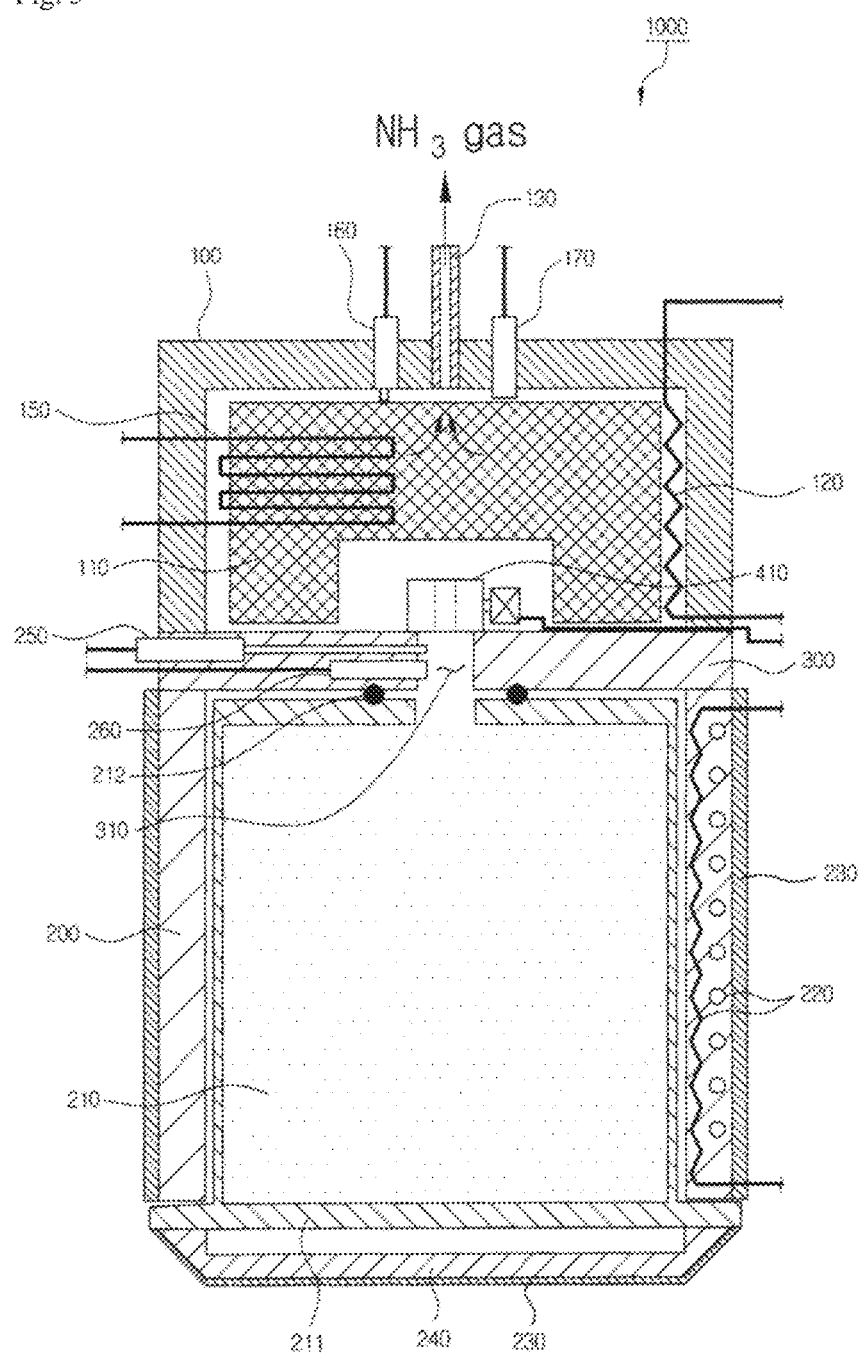
FIG. 5 is a conceptual view illustrating a reactor for solid ammonium salt according to another example embodiment of the present invention.
Figure 6:
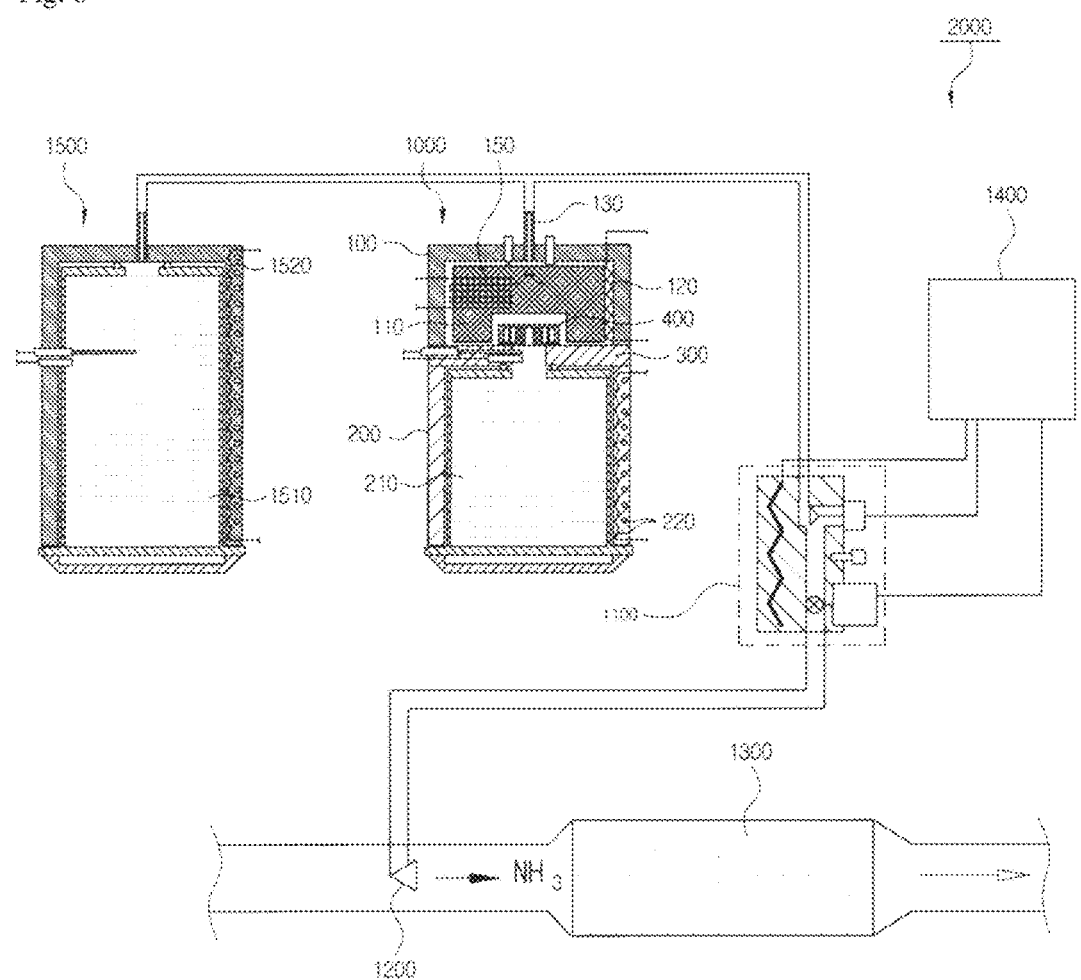
FIG. 6 is a conceptual view illustrating a NOx emission purification system using solid ammonium and selective catalytic reduction according to still another example embodiment of the present invention.

FIG. 2 is a conceptual view illustrating a NOx emission purification system using solid ammonium and selective catalytic reduction according to an example embodiment of the present invention. FIGS. 3 and 4 are conceptual views illustrating a reactor for solid ammonium salt in FIG. 2. FIG. 5 is a conceptual view illustrating a reactor for solid ammonium salt according to another example embodiment of the present invention. FIG. 6 is a conceptual view illustrating a NOx emission purification system using solid ammonium and selective catalytic reduction according to still another example embodiment of the present invention.

The reactor for solid ammonium salt 1000 according to the present example embodiment is a reactor generating an ammonium gas from the solid ammonium salt, and may be used for the NOx emission purification system using solid ammonium and selective catalytic reduction. Here, the NOx emission purification system includes the reactor for solid ammonium salt 1000 mentioned above, an ammonium dozing module 1100 connected to the reactor 1000 and controlling the providing of the ammonia generated in the reactor 100, an injecting nozzle 1200 connected to the ammonium dozing module and is disposed at an exhaust line to inject the ammonia into the exhaust line, a selective catalytic reduction 1300 disposed in the exhaust line and mixing NOx included in the exhaust gas with the ammonia injected into the exhaust line to deoxidize NOx into nitrogen and water, and an electric control unit 1400 connected to the reactor and the ammonium dozing module to control the generation and the providing of the ammonia. Thus, an amount of the ammonia generated from the reactor 1000 is controlled by the electric control unit 1400, and the generated ammonia flows into the ammonium dozing module 1100 such that the pressure and the amount of the flowing ammonia are controlled. Then, the ammonia is injected into the exhaust line. The injected ammonia is mixed with the exhaust gas exhausted from an internal combustion engine, and is reacted to be purified in the selective catalytic reduction 1300. Thus, NOx included in the exhaust gas is deoxidized into nitrogen harmless to human beings.

Here, the reactor 1000 for solid ammonium salt includes first and second chambers 100 and 200. The first chamber 100 has an exhaust 130 and a first heating element 120. Solid ammonium salt 110 is in the first chamber 100. The second chamber 200 has a second heating element 220 and is formed at a side of the first chamber 100. The first chamber 100 is connected with the second chamber 200. Solid ammonium salt 210 is in the second chamber 200. An amount of the solid ammonium salt in the second chamber 200 is more than that in the first chamber 100, so that the first chamber 100 is heated and cooled faster than the second chamber 200.

For example, the second chamber 200 is disposed at a side of the first chamber 100, and the first and second chambers 100 and 200 are formed with a single frame. Internal spaces of the first and second chambers 100 and 200 are connected with each other through a connecting portion 310. The solid ammonium salts 110 and 210 are respectively disposed in the first and second chambers 100 and 200. The first chamber 100 is heated by the first heating element 120 and the second chamber 200 is heated by the second heating element 220.

Here, the amount of the solid ammonium salt 210 in the second chamber 200 is more than that of the solid ammonium salt 110 in the first chamber 100, and thus the first chamber 100 may be heated faster than the second chamber 200 in an initial driving (heating) and the first chamber 100 may be cooled faster than the second chamber 200 in stopping the driving (cooling).

For example, a volume of the second chamber 200 is larger than that of the first chamber 100, and thus the solid ammonium salt 210 is stored in the second chamber 200 more than in the first chamber 100. Thus, the first chamber 100 is heated faster than the second chamber 200 when the first and second chambers 100 and 200 are heated at the same time. Likewise, the first chamber 100 having less solid ammonium salt is cooled faster than the second chamber 200.

As illustrated in FIG. 3, at the initial driving, the solid ammonium salt 110 in the first chamber 100 is sublimated faster and ammonia is firstly generated in the first chamber 100, and thus the generated ammonia may be provided to the ammonium dozing module 1100. Then, for a while, the second chamber 200 is heated to reach the sublimation temperature for the solid ammonium salt 210, and then the ammonium gas generated from the second chamber 200 passes through the connecting portion 310 and the first chamber 100 and is provided to the ammonium dozing module 1100. At stopping the driving, the first chamber 100 is firstly cooled, so that the ammonium gas in the first chamber 100 is changed into the solid ammonium salt to be stored in the first chamber 100.

Accordingly, in the reactor according to the present example embodiment, the first and second chambers are divided and the temperature of the first chamber is rapidly increased to thermally decompose the solid ammonium salt, and thus ammonia is rapidly generated at the initial driving of the internal combustion engine to decrease NOx. In addition, the energy consumption is decreased to heating the reactor.

In addition, the first chamber is cooled faster, and thus the solid ammonium salt firstly consumed at the first chamber is regenerated into the solid ammonium salt to be stored in the first chamber. Thus, at driving again, the solid ammonium stored in the first chamber is firstly heated to rapidly generate the ammonium gas.

In addition, a pressure valve 400 is disposed at the connecting portion 310 connecting the first and second chambers 100 and 200 with each other, and thus the pressure valve 400 is automatically open when the pressure of the second chamber 200 is higher than that of the first chamber 100.

For example, an inside of the first chamber 100 is connected to that of the second chamber 200 through the connecting portion 310, and the pressure valve 400 which is automatically open based on a pressure difference is disposed at the connecting portion 310. Here, the pressure valve 400 includes a spring and a valve. The pressure valve 400 is open when the pressure of the first chamber 100 is higher than that of the second chamber 200, and thus as illustrated in FIG. 4, the ammonia generated in the second chamber 200 moves to the first chamber 100 through the pressure valve 400. For example, the pressure valve 400 is automatically open or closed based on the pressure difference between the first and second chambers 100 and 200.

Here, the first and second chambers 100 and 200 are heated together but the solid ammonium salt 110 is firstly sublimated at the first chamber 100 to generate the ammonia, so that the ammonia generated from the second chamber 200 moves to the first chamber 100 via the pressure valve 400 after the solid ammonium salt 110 is completely consumed at the first chamber 100.

For example, the ammonium gas is not generated in the first chamber 100 when the solid ammonium salt 110 in the first chamber 100 is completely consumed, and thus the pressure of the first chamber 100 is decreased. Then, the solid ammonium salt 210 is sublimated into the ammonia at the second chamber 200 so the pressure of the second chamber 200 is increased. Thus, the ammonia moves from the second chamber 200 having higher pressure to the first chamber 100, and the ammonia moving the first chamber 100 is provided to the ammonium dozing module 1100.

Accordingly, the solid ammonium salt 110 in the first chamber 100 is rapidly and firstly heated to generate the ammonia and the ammonia is provided to the ammonium dozing module 1100. Then, the ammonia generated from the second chamber 200 is provided to the ammonium dozing module 1100 via the first chamber 100 when the solid ammonium salt 110 is completely consumed at the first chamber 100.

In addition, a blocking layer 300 may be formed between the first and second chambers 100 and 200 for the insulation.

As illustrated in FIG. 3, the blocking layer 300 through which the connecting portion 310 is formed is disposed between the first and second chambers 100 and 200, and thus the first and second chambers 100 and 200 are divided by the blocking layer 300. Thus, the heat generated from the first chamber 100 is prevented from being transmitted to the second chamber 200, and thus the first chamber 100 may be heated much faster at the initial driving and the ammonium gas may be generated much faster.

In addition, the first heating element 120 may be an electric heater 120, and the second heating element 220 may be one or a combination of an electric heater 220, an exhaust gas 222 and engine cooling water (not shown).

Thus, the first chamber 100 is rapidly heated by the electric heater 120 using the electricity which is an energy source of the internal combustion engine and thus is used at the initial driving of the internal combustion engine. The second chamber 200 is heated later using the exhaust gas 222 or a consumed heat of the engine cooling water (not shown) which is an energy source generated after the initial driving of the internal combustion engine, in addition to the electric heater 120. Thus, energy consumption may be decreased.

In addition, a heat transferring element (not shown) having an expanded shape, a porous shape or a mesh shape is formed in the first chamber 100, and the heat transferring element (not shown) includes a metal material to make contact with the first heating element 120. The solid ammonium salt 110 is formed at the heat transferring element (not shown).

For example, the heat transferring element (not shown) having the expanded shape, the porous shape or the mesh shape and including the metal material with a relatively wider surface and a relatively higher thermal conductivity is disposed in the first chamber 100, and the solid ammonium salt 110 is formed on the surface of the heat transferring element (not shown).

Thus, the first chamber 100 may be heated to reach the thermal decomposition temperature of the solid ammonium salt 110 much faster by the first heating element 120 making contact with the heat transferring element (not shown). Thus, the ammonia may be generated much faster at the initial driving of the internal combustion engine.

In addition, the first chamber 150 includes a rapid cooling element 150.

When the internal combustion engine stops driving, the first chamber 150 is rapidly cooled using the rapid cooling element 150. Thus, the ammonium gas inside of the first chamber 100 is sublimated to be generated as the solid ammonium salt 110.

Here, when the internal combustion engine stops driving, the first and second chambers 100 and 200 stop being heated and the rapid cooling element 150 in the first chamber 100 operates. Thus, the heat transferring element (not shown) in the first chamber 100 is rapidly cooled and the ammonium gas inside of the first chamber 100 is sublimated to the solid ammonium salt 110.

Thus, the solid ammonium salt 110 grows on the surface of the heat transferring element (not shown), and the ammonia is generated by the heat remaining in the second chamber 200 after stopping the internal combustion engine. Further, the ammonia generated in the second chamber 200 moves to the first chamber 100 via the pressure valve 400, and is sublimated to the solid ammonium salt 110 in the first chamber 100.

Accordingly, the solid ammonium salt grows to be stored in the first chamber by a constant amount after stopping the internal combustion engine, and thus the ammonia may be rapidly regenerated in the first chamber when driving the internal combustion engine again.

Here, the rapid cooling element 150 makes contact with the heat transferring element (not shown), and thus the heat transferring element (not shown) may be rapidly cooled. Thus, the solid ammonium salt may rapidly grow on the surface of the heat transferring element.

In addition, an insulating layer 230 is formed to cover an outside of the second chamber 200.

Thus, the heat remaining in the second chamber 200 is used to generate the ammonium gas for a constant period after stopping the internal combustion engine.

The ammonium gas generated in the second chamber 200 moves to the first chamber 100, and thus the solid ammonium salt 110 may be stored in the cooling first chamber 100 for a constant amount.

In addition, an end portion of the second chamber 200 is open to be combined with a cover 240, and the solid ammonium salt 210 in the second chamber 200 is formed as a replaceable solid ammonium salt cartridge.

For example, the solid ammonium salt 210 in the second chamber 200 is formed as the replaceable solid ammonium salt cartridge, and the solid ammonium salt cartridge may be replaceable. When the solid ammonium salt 210 in the second chamber 200 is completely consumed, the solid ammonium salt is replaced through the cover 240 by a cartridge type.

Here, the solid ammonium salt cartridge is spaced apart from an inner surface of the second chamber 200 to be easily inserted into the second chamber 200. The cover 240 has a concaved space portion inside and has heat insulating effect.

In addition, the solid ammonium salt cartridge is sealed by the case 211, and thus the solid ammonium salt cartridge may be inserted into the second chamber 200 by partially opening the case 211. Alternatively, the solid ammonium salt cartridge may be partially open right after inserted into the second chamber 200.

For example, the solid ammonium salt cartridge is enclosed or sealed by the case 211 and has an opening like a cap or a cork. Thus, the case 211 of the solid ammonium salt cartridge is partially open and is inserted into the second chamber 200 to be combined with the cover 240, so that the opening of the solid ammonium salt cartridge is connected to the connecting portion 310. Alternatively, right after the solid ammonium cartridge is inserted into the second chamber 200, the case 211 is partially open to be connected to the connecting portion 310.

In addition, the solid ammonium cartridge is enclosed or sealed, and has the opening through which the connecting portion 310 connecting the first and second chambers 100 and 200 with each other is connected. A sealing element 212 may be formed around the opening of the solid ammonium salt cartridge.

Thus, when the replaceable solid ammonium cartridge is inserted into the second chamber 200, the connecting portion 310 is connected to the opening of the solid ammonium salt cartridge and thus the sealing element 212 seals the connecting portion and the opening of the solid ammonium salt cartridge.

Here, the sealing element 212 is formed around the opening of the solid ammonium salt cartridge, and is tightly attached and disposed between the case 211 and the blocking layer 300.

In addition, the pressure valve 400 is formed in the connecting portion 310 through which the first and second chambers 100 and 200 are connected with each other, and the temperature sensor and the pressure sensor are formed at the first and second chambers 100 and 200.

The temperature and the pressure of the first chamber 100 are measured to find the consumption of the solid ammonium salt 110, and the second chamber 200 is also measured. For example, when the temperature is more than the temperature of the thermal decomposition of the solid ammonium salt or the pressure is lower than the pressure thereof, the solid ammonium salt is completely consumed and the ammonium gas is not generated. Thus, the solid ammonium salt or the solid ammonium salt cartridge may be timely replaced.

Here, end portions of the first temperature and pressure sensors 160 and 170 are positioned in the first chamber 100, and end portions of the second temperature and pressure sensors 250 and 260 are positioned in a space between the inner surface of the second chamber 200 and the case 211 of the solid ammonium salt cartridge. The second temperature and pressure sensors 250 and 260 are disposed at the blocking layer 300, and the end portions of the second temperature and pressure sensors 250 and 260 are disposed at the connecting portion 310.

In addition, a solenoid valve 410 is formed at the connecting portion 310 connecting the first and second chambers 100 and 200 with each other, the temperature and pressure sensors formed at the first and second chambers 100 and 200, and thus an ON/OFF of the solenoid valve is controlled based on the pressure measured at the first and second chambers 100 and 200.

Thus, the temperature and the pressure of the first and second chambers 100 and 200 are measured to control the temperature of the first and second chambers 100 and 200, and thus the solenoid valve 410 is open when the pressure of the first chamber 100 is higher than that of the second chamber 200. Thus, the ON/OFF of the solenoid valve 410 is easily controlled based on the difference of the pressure between the first and second chambers 100 and 200. Here, the temperature and the pressure of the first and second chambers 100 and 200 are measured to find the consumption of the solid ammonium salt.

In addition, the solid ammonium salt having substantially same ingredient is stored both in the first and second chambers 100 and 200.

For example, even though the solid ammonium salt 110 in the first chamber 100 is firstly sublimated into the ammonium gas and is completely consumed, the ammonium gas sublimated from the solid ammonium salt 210 in the second chamber 200 is changed and stored in the first chamber 100 again.

In the method of controlling the reactor for the solid ammonium salt, first and second chambers of the reactor for solid ammonium salt are heated to provide ammonia to an ammonium dozing module (step S10). The ammonia is generated from sublimating the solid ammonium salt in the first chamber. A heat provided into the second chamber is controlled to maintain the pressure of the second chamber within a constant pressure range, to provide ammonia to the ammonium dozing module via the first chamber (step S20). The ammonia is generated from the sublimating solid ammonium salt in the second chamber. Heating the first and second chambers is stopped and the first chamber is cooled faster than the second chamber, so that the ammonia generated in the second chamber is sublimated in the first chamber to be stored as the solid ammonium salt (step S30).

The reactor 1000 for the solid ammonium salt is controlled by the method at the initial driving, a normal driving and the stop of the driving of the internal combustion engine.

First, at the initial driving, as the step S10, the first and second chambers 100 and 200 are heated, and the ammonia generated from the first chamber 100 which reaches the temperature of the thermal decomposition of the solid ammonium salt is provided to the ammonia dozing module 1100. At the normal driving, as the step S20, the second chamber 200 is heated later to reach the temperature of the thermal decomposition of the solid ammonium salt, and the ammonia generated from the second chamber 200 is provided to the ammonia dozing module 1100 via the first chamber 100. Here, the pressure of the second chamber 200 is maintained at the range between about 2 bar and about 10 bar.

Finally, at the stop of the driving, as the step 30, the heating of the first and second chambers 100 and 200 is stopped, and then the first chamber 100 is rapidly cooled and the ammonia is continuously generated in the second chamber 200 due to the remaining heat of the second chamber 200. Thus, ammonium gas generated from the second chamber 200 is sublimated in the rapid cooling first chamber 100 and is stored as the solid ammonium salt 110 in the first chamber 100.

Thus, the ammonia is rapidly provided at the initial driving, and the ammonia is normally and stably provided at the normal driving. Further, the solid ammonium salt is stored at the first chamber by a constant amount after stopping the driving, and thus the ammonia is rapidly provided again at the re-driving.

In addition, in the step S20, when the temperature of the second chamber 200 is increased over the predetermined temperature but the temperature of the second chamber 200 is not increased, an alarm or a warning light is operated (step S21).

For example, when the temperature of the second chamber 200 is increased more than the temperature of the thermal decomposition of the solid ammonium salt but the pressure thereof is not increased, the solid ammonium salt 210 is completely consumed and the ammonia is not generated. Thus, the alarm or the warning light is operated to inform the operator to replace or charge the solid ammonium salt 210.

The NOx emission purification system 2000 using the solid ammonium salt and selective catalytic reduction, may further include a subsidiary reactor 1500 for solid ammonium salt. The subsidiary reactor 1500 has a heating element 1520 and is connected to the ammonia dozing module 1100. Solid ammonium salt 1510 is in the subsidiary reactor 1500.

For example, as illustrated in FIG. 6, the subsidiary reactor 1500 for the solid ammonium salt is connected to the ammonium dozing module 1100, and thus the ammonium gas may be provided to the ammonium dozing module 1100 using the subsidiary reactor 1500 when the solid ammonium salt is completely consumed in the first and second chambers 100 and 200 of the reactor 1000.

The solid ammonium salt may be ammonium carbamate ($NH_2COOCH_4$) or ammonium carbonate ($(NH_4)_2CO_3$), and thus is thermally decomposed into the ammonia at about 60° C. Thus, the reacting temperature of the ammonia is maintained lower, compared to using the solid urea, and thus electric energy may be less consumed and additional products due to the decomposition of the solid urea may be prevented from being generated.

Here, reaction formula for the thermal decomposition of ammonium carbamate (NH$_2$COOCH$_4$) or ammonium carbonate ((NH$_4$)$_2$CO$_3$) is as follows.

$$NH_2COONH_4 \leftrightarrow 2NH_3 + CO$$

$$(NH_4)_2CO_3 \leftrightarrow 2NH_3 + CO_2 + H_2O$$

When the generated ammonia is injected to the exhaust line, the representative reaction formula for purifying NOx in the selective catalytic reduction is as follows.

$$NO + NO_2 + 2NH_3 \rightarrow 2N_2 + 3H_2O$$

According to the present invention, first and second chambers are divided in the reactor and the temperature in the first chamber is rapidly increased to reach the temperature of the thermal decomposition of solid ammonium salt, and thus NOx may be rapidly decreased at an initial driving of the vehicle and the energy consumption may be decreased to heat the reactor.

The foregoing is illustrative of the present teachings and is not to be construed as limiting thereof. Although a few exemplary embodiments have been described, those skilled in the art will readily appreciate from the foregoing that many modifications are possible in the exemplary embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A reactor for solid ammonium salt, the reactor comprising:
   a first chamber having an exhaust and a first heating element, solid ammonium salt being in the first chamber, the first heating element configured to heat the first chamber; and
   a second chamber having a second heating element and formed at a side of the first chamber, the first chamber being connected with the second chamber, solid ammonium salt being in the second chamber, the second heating element configured to heat the second chamber,
   wherein a volume of the second chamber is larger than that of the first chamber and thus an amount of the solid ammonium salt in the second chamber is more than that in the first chamber,
   wherein the second chamber is directly connected only to the first chamber through a connecting portion and thus an ammonium gas generated from the second chamber is provided only to the first chamber, and
   wherein the ammonium gas is provided to an ammonium dozing module from the first chamber only.

2. The reactor of claim 1, wherein a connecting portion connecting the first chamber with the second chamber has a pressure valve, and the pressure valve is automatically open when the pressure of the second chamber is higher than that of the first chamber.

3. The reactor of claim 1, wherein a blocking layer is formed between the first and second chambers for insulation.

4. The reactor of claim 1, wherein the first heating element is an electric heater, and the second heating element is one or a combination of an electric heater, an exhaust gas and an engine cooling water.

5. The reactor of claim 1, wherein a heat transferring element having an expanded shape, a porous shape or a mesh shape is formed in the first chamber,
   the heat transferring element includes a metal material to make contact with the first heating element, and
   the solid ammonium salt is formed at the heat transferring element.

6. The reactor of claim 1, wherein the first chamber comprises a rapid cooling element.

7. The reactor of claim 1, wherein an insulating layer is formed to cover an outside of the second chamber.

8. The reactor of claim 1, wherein an end portion of the second chamber is open to be combined with a cover, and the solid ammonium salt in the second chamber is formed as a replaceable solid ammonium salt cartridge.

9. The reactor of claim 8, wherein the solid ammonium salt cartridge is sealed, and thus the solid ammonium salt is partially open to be inserted into the second chamber or is partially open right after inserted into the second chamber.

10. The reactor of claim 8, wherein the solid ammonium salt cartridge is sealed and has an opening through which a connecting portion connecting the first and second chambers with each other is connected,
    wherein a sealing element is formed around the opening of the solid ammonium salt cartridge.

11. The reactor of claim 1, wherein a pressure valve is formed at a connecting portion connecting the first and second chambers with each other, and a temperature sensor and a pressure sensor are formed at the first and second chambers.

12. The reactor of claim 1, wherein a solenoid valve is formed at a connecting portion connecting the first and second chambers with each other, and a temperature sensor and a pressure sensor are formed at the first and second chambers, and thus an ON/OFF of the solenoid valve is controlled based on the pressure measured at the first and second chambers.

13. The reactor of claim 1, wherein the solid ammonium salt having substantially same ingredient is stored both in the first and second chambers.

14. A NOx emission purification system using solid ammonium salt and selective catalytic reduction, the NOx emission purification system comprising:
    the reactor for solid ammonium salt of claim 1;
    an ammonium dozing module connected to the exhaust of the reactor and controlling the providing of the ammonia generated in the reactor;
    an injecting nozzle connected to the ammonium dozing module and disposed at an exhaust line, to inject the ammonia into the exhaust line;
    a selective catalytic reduction disposed in the exhaust line, and mixing NOx included in the exhaust gas with the ammonia injected into the exhaust line to deoxidize NOx into nitrogen and water; and
    an electric control unit connected to the reactor and the ammonium dozing module, to control the generation and the providing of the ammonia.

15. The NOx emission purification system of claim 14, further comprising:
    a subsidiary reactor for solid ammonium salt having a heating element and connected to the ammonium dozing module, solid ammonium salt being in the subsidiary reactor.

16. The NOx emission purification system of claim 1, wherein the solid ammonium salt is ammonium carbamate ($NH_2COOCH_4$) or ammonium carbonate (($NH_4)_2CO_3$).

* * * * *